United States Patent [19]
Nudelmont et al.

[11] Patent Number: 5,206,972
[45] Date of Patent: May 4, 1993

[54] DEVICE FOR CLOSING THE END OF A SECTION

[75] Inventors: Jean C. Nudelmont, Neuilly sur Seine; Amedee Gagliardi, Cravent, both of France

[73] Assignee: P.G.E.P., Professional General Electric Products, Coubevoie, France

[21] Appl. No.: 824,111

[22] Filed: Jan. 23, 1992

[30] Foreign Application Priority Data

Jan. 23, 1991 [FR] France ............................. 9100725

[51] Int. Cl.[5] .......................... E05D 13/00; H02G 3/04
[52] U.S. Cl. ..................................... 16/95 R; 16/108; 174/49
[58] Field of Search .................. 16/95 R, 108, 94 R, 16/94 D; 174/49

[56] References Cited

U.S. PATENT DOCUMENTS

| 1,509,407 | 9/1924 | Mac Quarrie | 16/94 R |
| 4,068,345 | 1/1978 | Hehl et al. | 16/94 D |
| 4,934,023 | 6/1990 | Schubring | 16/95 R |

*Primary Examiner*—Lowell A. Larson
*Assistant Examiner*—Carmine Cuda
*Attorney, Agent, or Firm*—Darby & Darby

[57] ABSTRACT

Device for closing the end of a section (1) of U-shaped cross section having a bottom (10) and two flanges (12) provided near the open face of the section with a rail (13) turned toward said bottom (10), characterized in that it includes a ferrule (2) carrying on its lower side two lugs (21) and on its upper side two positioning nipples (22) and two hooks (23) having slots (24) and a stop piece formed by a spindle (3) engaging into the slots.

16 Claims, 2 Drawing Sheets

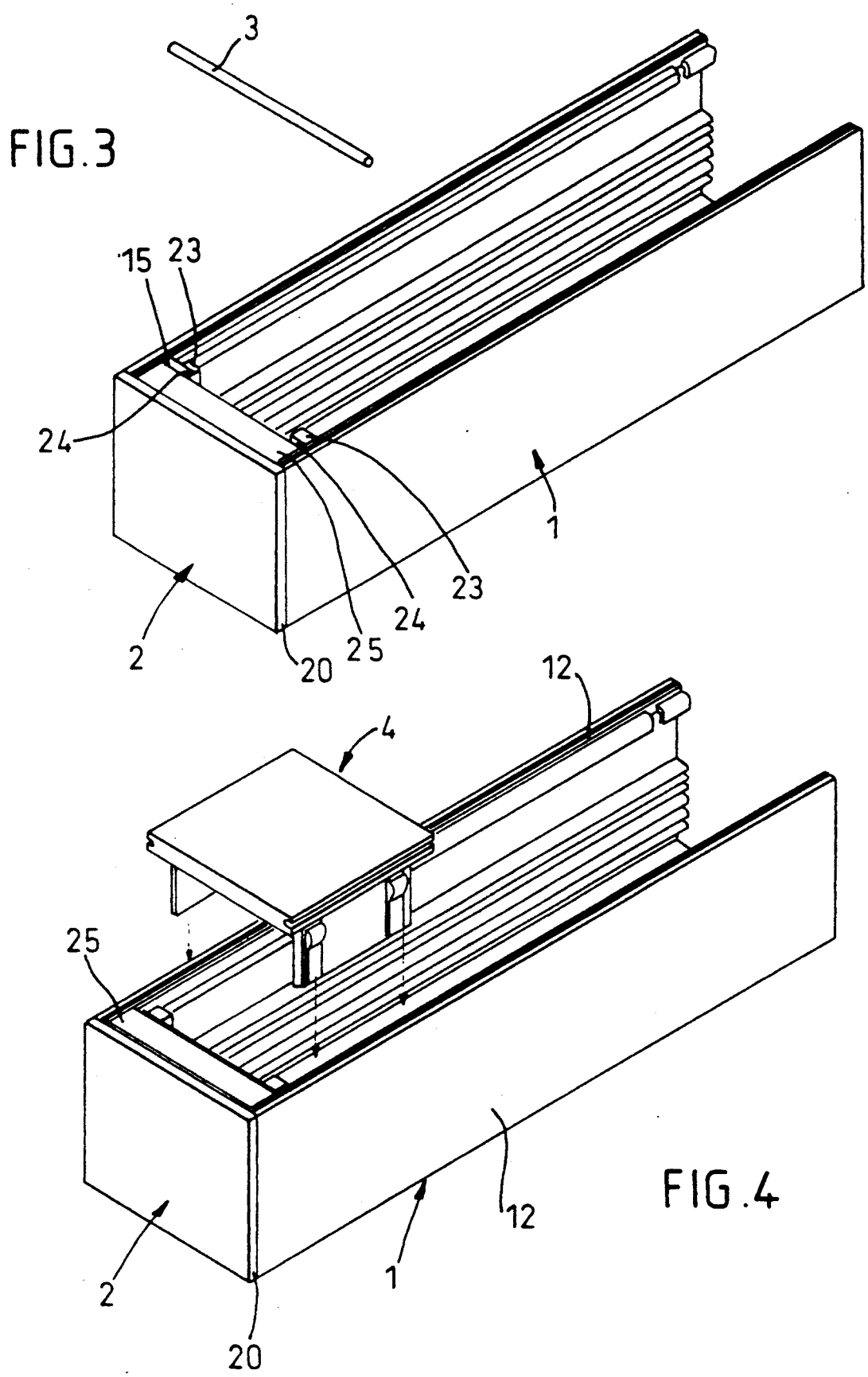

DEVICE FOR CLOSING THE END OF A SECTION

The present invention relates to installations using sections, for example of aluminum.

Such installations are intended, for example, for the distribution of electricity in a building. Placing sections along walls for the passage of electric lines without making holes in the wall is, in fact, known.

The sections taken into use have a U-shaped cross-section, the bottom of which is placed against the wall so that the flanges are perpendicular to the wall and the open face is thus directed toward the front.

The electric wires are then laid into said sections and the open face is closed with snap-in blocks allowing functions such as outlets or switches. The open face is finally closed with trim strips.

Very often the problem arises in these installations of closing the end of the section securely and elegantly.

In fact, the devices known at present are often snapped into the section making them easy to pull out and not allowing a beautiful finish.

It is therefore the object of the invention to propose a closure device that is elegant while being easy to install and to remove but cannot be torn out. To this end, the device for closing the end of a U-section having a bottom and two flanges provided near the open face of the section with a rail turned toward said bottom, according to the invention, is characterized in that it includes a ferrule carrying on its lower side two lugs and on its upper side two positioning nipples and two hooks having slots and a stop piece formed by a spindle.

According to other characteristics of the invention:

the spindle is kept in its stopping position by an element for closing the open face of the section;

the lugs have downwardly directed plugs engaging into slashes in the bottom of the section;

the positioning nipples are parallelepipedal and engage under the rails;

the hooks are spaced by a distance such that they can position themselves on the exterior of said rails against the return directed toward the bottom of the section that they present;

the spindle is positioned in seats formed by the slots of the hooks and by interruptions of equal width of the rails.

The present invention will be better understood and other advantages thereof will become evident from the description of the attached drawing in which:

FIGS. 2, 3, 4 show different phases of the installation.

Figure 1:
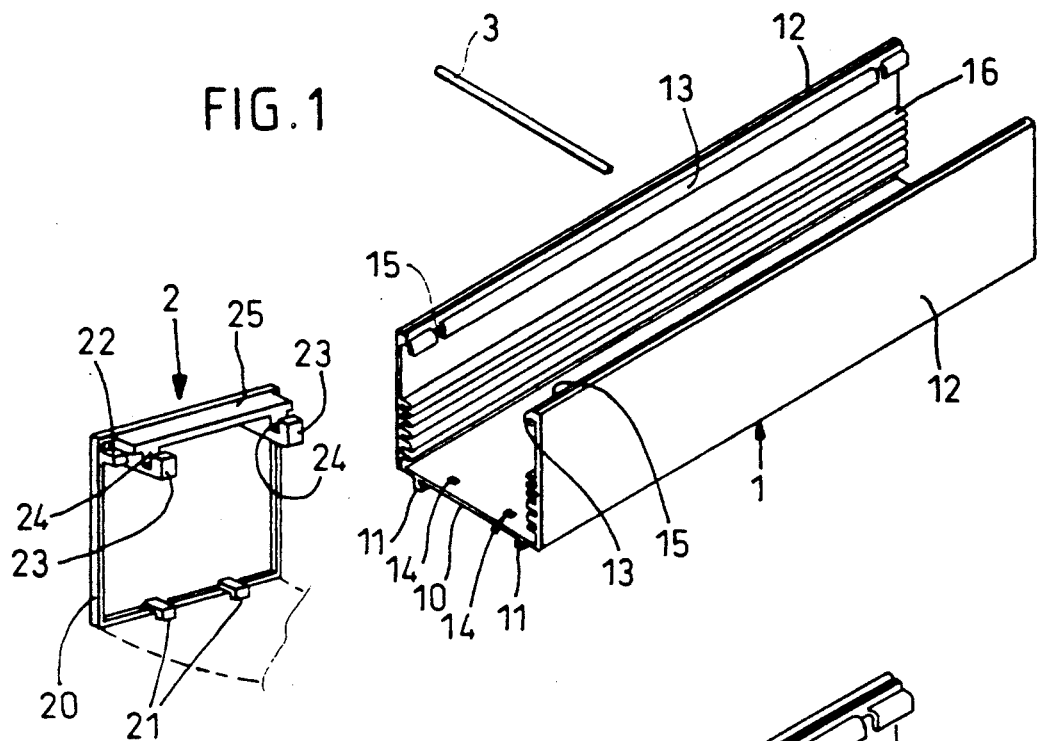
FIG. 1 represents the various pieces taken into use in the invention.

In FIG. 1 is seen the section 1 of aluminum of U-shaped cross section. The bottom 10 of the section is intended to be fastened on a support such that it can also be positioned on a rail owing to the slides 11 provided on the outer face.

Section 1 also has two flanges 12 which will be perpendicular to the wall when the section is in place, in the usual manner, these flanges are provided with ribs 16 on their inner face.

Near the open face of the section, the flanges 12 present a rail 13 turned toward the bottom 10, having a face parallel to the bottom 10 positioned near the edge of flange 12 and a return in the direction of the bottom 10.

The closing device according to the invention has a ferrule 2 of a dimension such that it fully and exactly covers the end of the section. As can be seen in FIGS. 3, 4, the face of ferrule 2 intended to be turned toward the exterior is smooth (plain), but of course one could provide to embellish this face with designs in order to decorate it. It is also possible to provide an opening in order to connect a pipe to the section.

On its face turned toward the interior of section 1, the ferrule 2 presents a peripheral skirt 20 of low height intended to be positioned in continuation of each of the walls of the section.

Two lugs 21 are positioned on the lower side of the ferrule and extend spaced from the end of the skirt 20.

Near the upper side are provided two positioning nipples 22. These nipples are parallelepipedal and are of a dimension such that they can engage under the rails 13 of the section. The upper side of the ferrule carries also two hooks 23 directed upward, the slot 24 of which is separated from the skirt by a dimension greater than the length of the nipples 22.

The ferrule 2 further presents a wall 25 extending along the upper side, in the same plane as the skirt, and it covers the part of the hooks 23 situated between said skirt 20 and slot 24.

This wall 25 has a dimension smaller than that of ferrule 2 in order to position itself with play between the flanges 12 of section 1.

At its end the section 1 presents means for setting the ferrule 2 in place. These means are formed by slashes 14 on the bottom 10 of a dimension equal to that of the downwardly directed plugs of the lugs 21 and by interruptions 15 of the rails 13 at a distance from the end of the section equal to the distance separating the slots 24 of the hooks 23 from the skirt 20. The device according to the invention also includes a spindle 3 of a length such that one can place it transversely between the flanges 12 of the section and of a diameter slightly smaller than the widths of the slots 24 and interruptions 15 of the rails 13.

Figure 2:
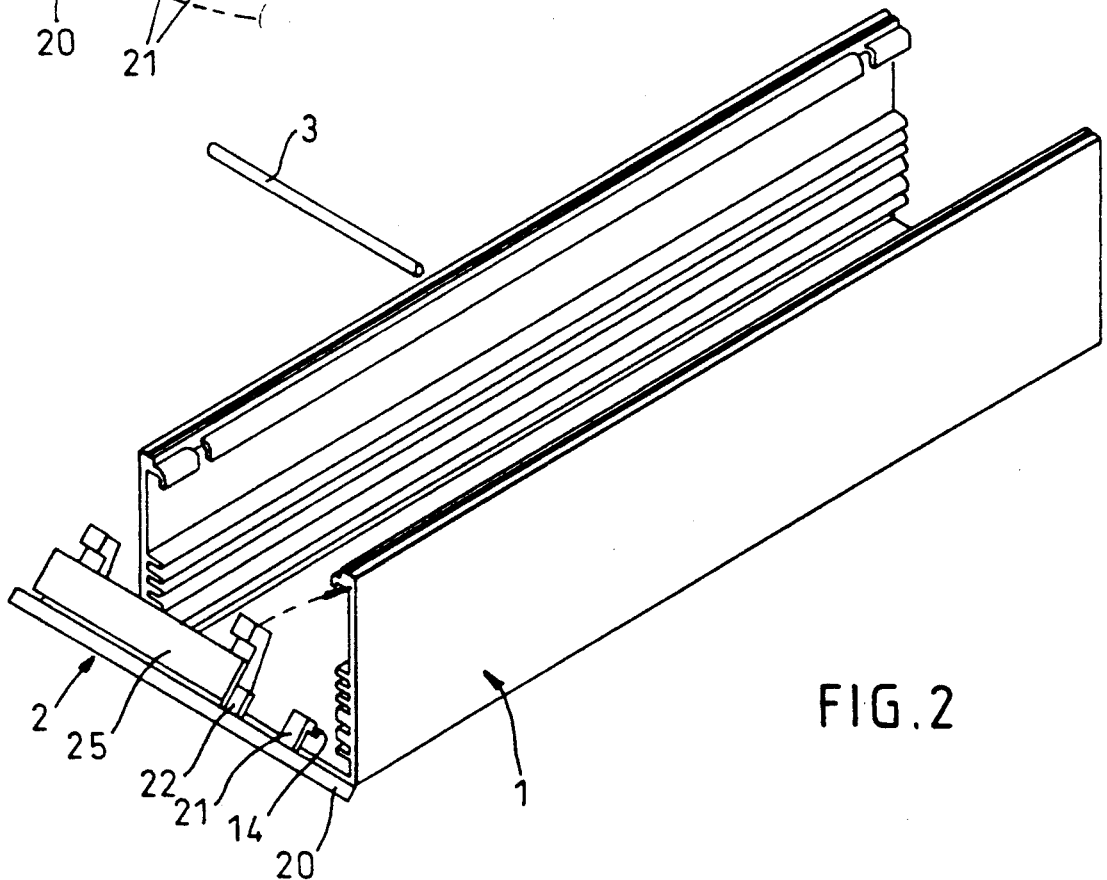

As can be seen in FIG. 2, first the device is set in place by positioning the ferrule 2 with the lower side of the skirt 20 against the end of the bottom 10 of the section and then it is swung so that downwardly directed plugs of the lugs 21 penetrate into the slashes 14.

As the swinging of ferrule 2 is continued, the positioning nipples 22 come to set themselves in place under the rails 13, while the hooks 23 position themselves on the exterior of said rails 13, against the return directed toward the bottom thereof, the spacing between said hooks 23 being provided to that effect.

When the ferrule 2 is thus put in place, as seen in FIG. 3, the slots 24 of the hooks 23 and the interruptions 15 of the rails 13 are aligned. The spindle 3 is then set in place in the seats formed by these slots 24 and interruptions 15, thereby forming an efficient stop piece to prevent the ferrule 2 from being pulled out.

The spindle 3 has a diameter such that it can be lodged in these seats by a pressure that can be exerted by hand.

The hold of spindle 3 is further ensured by elements 4 intended to close the open face of the section, whose form is such that the first of these can perfectly cover the seating of spindle 3. Thus this spindle 3 ensuring the retention of the closing device in position will never be able to come out from its seat inopportunely even if its diameter has been provided a little small or if it is worn.

It will have been understood that the device according to the invention is always perfectly positioned by the use of the lugs 21 and nipples 22, which permits obtaining an elegant appearance as the skirt 20 is always aligned with the faces of the section, and that, moreover, it cannot be torn out owing to the presence of the spindle 3 maintained under all circumstances by the element 4 for closing the open face.

The closing device can, however, be disassembled when this becomes necessary, by removing or sliding the elements 4 for closing the open face and then taking out the spindle 3 before swinging the ferrule 2.

We claim:

1. Device for closing the end of a section of U-shaped cross section having a bottom and two flanges provided near the open face of the section with a rail turned toward said bottom comprising: a ferrule carrying on its lower side two lugs and on its upper side two positioning nipples and two hooks having slots and a stop piece formed by a spindle that engages in said slots.

2. Device according to claim 1, wherein the spindle is held in its stopping position by an element for closing the open face of the section.

3. Device according to claim 2, wherein the lugs have plugs turned downward engaging in slashes in the bottom of the section.

4. Device according to claim 2, wherein the positioning nipples are parallelepipedal and engage under the rails.

5. Device according to claim 2, wherein the hooks are spaced by a distance such that they can place themselves on the exterior of said rails against the return directed toward the bottom of the section which they present.

6. Device according to claim 2, wherein the spindle is positioned in seats formed by the slots of the hooks and by interruptions of equal width of the rails.

7. Device according to claim 1 wherein the lugs have plugs turned downward engaging in slashes in the bottom of the section.

8. Device according to claim 7, wherein the positioning nipples are parallelepipedal and engage under the rails.

9. Device according to claim 7, wherein the hooks are spaced by a distance such that they can place themselves on the exterior of said rails against the return directed toward the bottom of the section which they present.

10. Device according to claim 7, wherein the spindle is positioned in seats formed by the slots of the hooks and by interruptions of equal width of the rails.

11. Device according to claim 1, wherein the positioning nipples are parallelepipedal and engage under the rails.

12. Device according to claim 11, wherein the hooks are spaced by a distance such that they can place themselves on the exterior of said rails against the return directed toward the bottom of the section which they present.

13. Device according to claim 11, wherein the spindle is positioned in seats formed by the slots of the hooks and by interruptions of equal width of the rails.

14. Device according to claim 1, wherein the spindle is positioned in seats formed by the slots of the hooks and by interruptions of equal width of the rails.

15. Device according to claim 1, wherein the hooks are spaced by a distance such that they can place themselves on the exterior of said rails against the return directed toward the bottom of the section which they present.

16. Device according to claim 15, wherein the spindle is positioned in seats formed by the slots of the hooks and by interruptions of equal width of the rails.

* * * * *